United States Patent
Reddy et al.

(10) Patent No.: US 11,275,791 B2
(45) Date of Patent: Mar. 15, 2022

(54) AUTOMATIC CONSTRUCTION AND ORGANIZATION OF KNOWLEDGE GRAPHS FOR PROBLEM DIAGNOSES

(71) Applicant: International Business Machines Corporation, Armonk, NY (US)

(72) Inventors: Chandrasekhara K. Reddy, Kinnelon, NJ (US); Jayant R. Kalagnanam, Briarcliff Manor, NY (US); Kiran A. Kate, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 16/368,043

(22) Filed: Mar. 28, 2019

(65) Prior Publication Data

US 2020/0311134 A1 Oct. 1, 2020

(51) Int. Cl.
 *G06F 16/00* (2019.01)
 *G06F 16/904* (2019.01)
 *G06F 16/901* (2019.01)

(52) U.S. Cl.
 CPC ........ *G06F 16/904* (2019.01); *G06F 16/9024* (2019.01)

(58) Field of Classification Search
 CPC . G06F 16/9024; G06F 16/904; G06F 16/9027
 See application file for complete search history.

(56) References Cited

U.S. PATENT DOCUMENTS

| | | | |
|---|---|---|---|
| 5,546,507 A | 8/1996 | Staub | |
| 8,321,409 B1* | 11/2012 | Jain | G06F 16/33 707/723 |
| 9,286,391 B1* | 3/2016 | Dykstra | G06F 16/9024 |
| 9,367,809 B2* | 6/2016 | Puri | G06F 11/0706 |
| 9,503,452 B1* | 11/2016 | Kumar | H04L 67/306 |
| 10,430,722 B2* | 10/2019 | Glass | G16H 10/20 |
| 10,671,672 B1* | 6/2020 | Eksombatchai | G06F 16/9024 |
| 2011/0119212 A1* | 5/2011 | De Bruin | G16H 50/70 706/12 |
| 2013/0191416 A1* | 7/2013 | Lee | G06F 16/2457 707/771 |
| 2014/0247153 A1* | 9/2014 | Proud | H02J 50/20 340/870.09 |

(Continued)

OTHER PUBLICATIONS

Hakkani-Tur, et al., Using a Knowledge Graph and Query Click Logs for Unsupervised Learning of Relation Detection, Proceedings of IEEE intl conf on Acoustics, Speech and Signal Processing (ICASSP), Oct. 2013, pp. 8327-8331.

(Continued)

*Primary Examiner* — Leslie Wong

(74) *Attorney, Agent, or Firm* — Daniel Morris; Otterstedt, Wallace & Kammer, LLP

(57) ABSTRACT

A method for automatically constructing and organizing a navigation graph includes receiving input data including a plurality of reports, at least two of the reports including plots, extracting a plurality of variables from the plots, building a knowledge graph from the input, wherein each node of the knowledge graph is associated with an individual one of the plots and an edge is added between two of the nodes sharing at least one of the variables in common, adding an edge weight to each of the edges of the knowledge graph, and organizing the nodes of the knowledge graph for navigation, wherein the knowledge graph is displayed in a user interface.

18 Claims, 5 Drawing Sheets

(56) References Cited

U.S. PATENT DOCUMENTS

| | | | |
|---|---|---|---|
| 2016/0188713 A1* | 6/2016 | Green | G06F 16/38 |
| | | | 707/738 |
| 2016/0328406 A1* | 11/2016 | Convertino | G06F 3/04842 |
| 2017/0083669 A1 | 3/2017 | Surprenant et al. | |
| 2017/0193393 A1 | 7/2017 | Contractor et al. | |
| 2018/0039620 A1* | 2/2018 | Ciulla | G06F 16/9024 |
| 2018/0075035 A1* | 3/2018 | Carlyle | G06F 16/212 |
| 2018/0107801 A1* | 4/2018 | Guo | G16H 15/00 |
| 2018/0330248 A1* | 11/2018 | Burhanuddin | G06N 20/10 |
| 2018/0373701 A1* | 12/2018 | McAteer | G06F 16/9024 |
| 2019/0252074 A1* | 8/2019 | Datla | G06F 16/90324 |
| 2019/0266497 A1* | 8/2019 | Yuan | G06Q 50/01 |
| 2020/0250235 A1* | 8/2020 | Abhyankar | G06F 16/907 |
| 2020/0250562 A1* | 8/2020 | Bly | G06N 5/022 |
| 2020/0301953 A1* | 9/2020 | Abhyankar | G06N 5/022 |
| 2020/0302359 A1* | 9/2020 | Jose | G06N 5/02 |

* cited by examiner

AUTOMATIC CONSTRUCTION AND ORGANIZATION OF KNOWLEDGE GRAPHS FOR PROBLEM DIAGNOSES

BACKGROUND

The present disclosure relates generally to root cause analysis (RCA), and more particularly to methods for constructing and organizing knowledge graphs.

RCA describes approaches, tools and methods for detecting causes of problems. RCA methods are typically structured to analyze an event and detect its underlying cause.

Intelligence reports are typically used to understand these events and issues, and to find one or more root causes. An exhaustive analysis may require a number of intelligence reports. The number of intelligence reports can present a cognitive load that may overwhelm a user and can hinder the navigation of reports.

BRIEF SUMMARY

According to an embodiment of the present invention, a method for automatically constructing and organizing a navigation graph comprises receiving input data including a plurality of reports, at least two of the reports comprising plots, extracting a plurality of variables from the plots, building a knowledge graph from the input, wherein each node of the knowledge graph is associated with an individual one of the plots and an edge is added between two of the nodes sharing at least one of the variables in common, adding an edge weight to each of the edges of the knowledge graph, and organizing the nodes of the knowledge graph for navigation, wherein the knowledge graph is displayed in a user interface.

According to an embodiment of the present invention, a method for guiding a review of documents comprises receiving input data including a plurality of reports comprising a plurality of plots of data, extracting a plurality of variables from the plots, building a knowledge graph from the input, wherein each node of the knowledge graph is associated with an individual one of the plots and an edge is added between two of the nodes sharing at least one of the variables in common, adding an edge weight to each of the edges of the knowledge graph, organizing the nodes of the knowledge graph for navigation, tracking a sequence of previously reviewed reports of the plurality of reports, identifying top-k nodes from the nodes of the knowledge graph, wherein the top-k nodes correspond to reports of the plurality of reports that have not been reviewed and that are determined to have respective affinity scores closest to one of a last report to be reviewed according to the tracking and a sequence of reports previously reviewed according to the tracking, and ranking the top-k nodes, wherein the reports corresponding to the top-k nodes are displayed in a user interface in a ranked order.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:
  systematic root cause analysis using a knowledge graph, tracking and calculation of affinity scores for nodes in the knowledge graph
  a user interface graphically displaying a view of the root cause analysis.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to one or more exemplary embodiments of the present invention, a method for visualizing (e.g., organizing and managing) related reports improves root cause analysis. According to some embodiments, a guided sequence of examination of the reports further improves the root cause analysis.

According to one or more embodiments of the present invention, information in a group of reports is used to automatically connect and organize the reports hierarchically. Semantic knowledge about the report, where available, is used to augment the connections and organization of the reports.

According to some embodiments, a system receives input including two or more of reports (comprised of plots, graphs, charts, tables, etc.), and either or both of (a) semantic models giving relationships between terms and phrases describing the reports, and (b) formulas for calculating the elements (such as axes) of the reports. According to one or more embodiments, the system outputs include, for example, a diagnosis tree/graph, related reports connected and organized hierarchically, and dynamic context-based recommendations for next reports to examine among the related reports.

Figure 1:
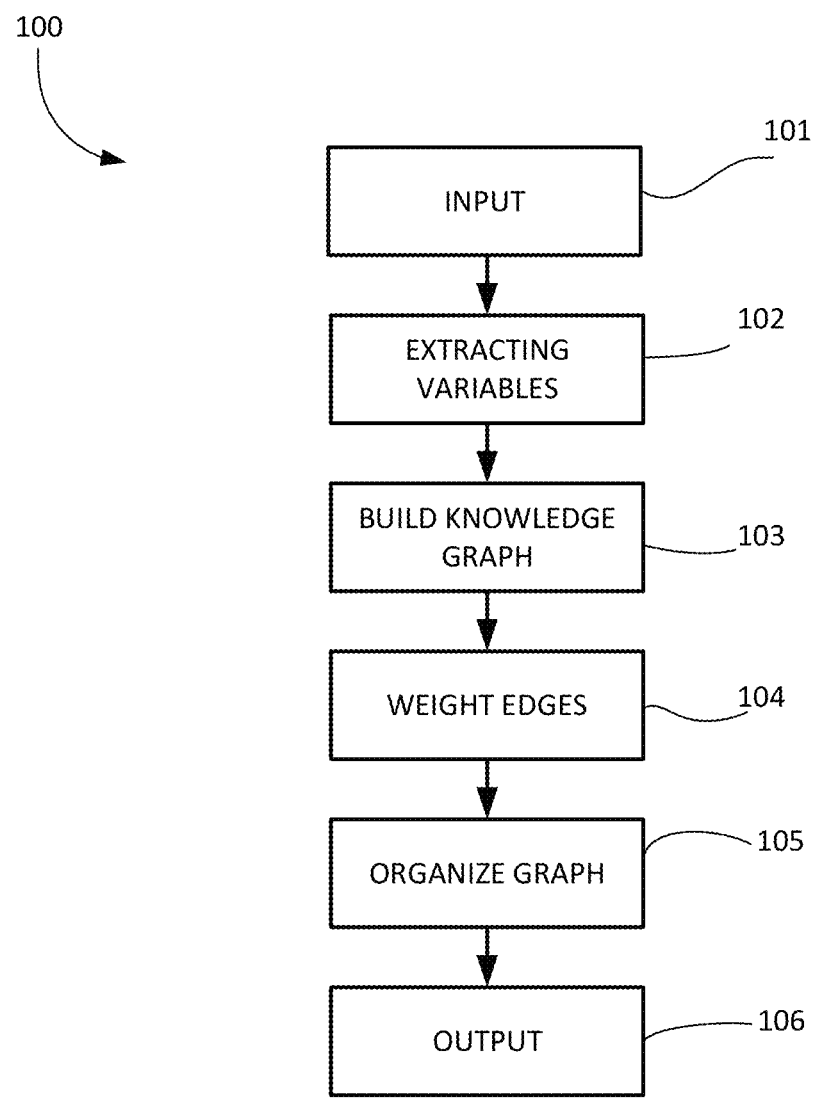
FIG. 1 depicts a method of organizing knowledge graphs according to an embodiment of the present invention.

Referring to FIG. 1, according to one or more embodiments of the present invention, a method 100 includes receiving input data 101, which includes, for example, plots, pivot tables, semantic models and formulas 102, building a knowledge graph 103 from the input, wherein each node of the knowledge graph is associated with an individual report, and an edge is added between two nodes if the corresponding reports share a common variable in their formulas. Optionally, an edge is added between two nodes if their corresponding reports have related language features in their descriptions. The method 100 further includes adding edge weights 104, which are based on the number and importance of common variables, and on features that are semantically related (as represented in the semantic model). The method 100 further includes organizing the knowledge graph conceptually for navigation 105, including for example, a hierarchical clustering, and cliques and connected components. The method 100 outputs 106 an organized navigation graph.

To illustrate the exemplary method of FIG. 1, consider the following example from the field of health diagnostics. Given three reports, each with a plot: (1) heart beats (h) over time (t), (2) number of steps (s) over time (t), and (3) steps per minute (s/t) vs. heart rate (h/t), by examining variables common to two or more formulas from the plots, it is determined that reports 1 and 3, reports 2 and 3, and reports 1 and 2 are related. These relationships are represented in the knowledge graph by the edges <1,3>, <2,3> and <1,2>, respectively, where nodes 1, 2 and 3 correspond to the reports 1, 2 and 3. (In the following, a node can be referred to by the report the node represents, or vice versa.)

In the example above, the node pairs (1,3) and (2,3) associated with the edges <1,3> and <2,3> have a stronger relationship than the node pair (1,2), represented by the edge <1,2>, based on the number of variables the corresponding reports share. More particularly, at blocks 103 and 104 shared variables are detected and evaluated for nodes (reports) 1 and 3 on the basis of heart beats (h) over time (t) from report 1 and heart rate (h/t) from report 3. Similarly, shared variables are detected and evaluated for nodes 2 and 3 on the basis of number of steps (s) over time (t) from report 2 and steps per minute (s/t) from report 3. Each node pair is similarly evaluated.

Consider another report including a plot (i.e., plot 4), which conveys distance in miles (d) over time (t). Since distance (d) is semantically related to steps (s), node pair (2,4) has stronger relationship than node pair (1,4) although they both share one variable explicitly. Further, if there is another report including a plot (i.e., plot 5) representing calories consumed over time, then plot 5 has weak relationship with the other plots. Hence, plot 5 and other possible related reports fall in a different category (e.g., diet). Reports with plots 1 to 4, on the other hand, are organized into another category (e.g., exercise). These two categories (i.e., diet and exercise) form, hierarchically, another category (e.g., patient health category). This hierarchy can be further extended based on other available reports.

The weight of an edge determined at block 104 signifies the strength of the relationship between the reports corresponding to the nodes it connects. If a variable that is common to both the reports is also present in many reports, then the variable's contribution to the weight is considered to be relatively low. According to one or more embodiments, an exemplary measure that can be used to signify the contribution of a variable is $\log(N/(1+n))$, where n is the number of reports in which the variable occurs and N the total number of reports. This is the same as inverse document frequency. According to some embodiments, the weight of an edge can be calculated as the sum of the contributions of the variables common to the reports connected by the edge.

Figure 2:
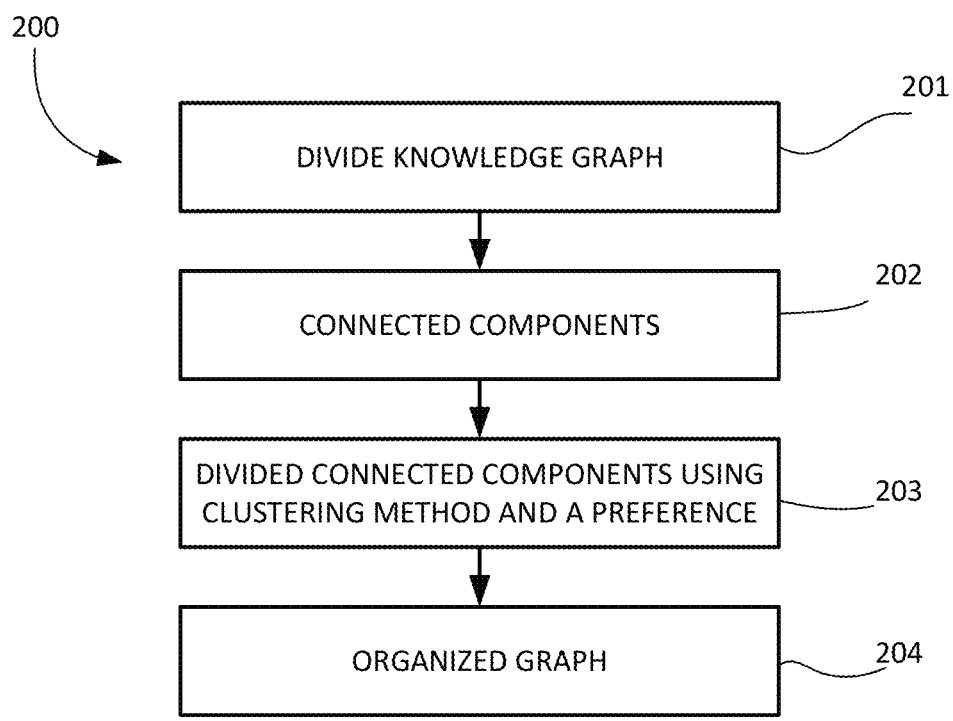
FIG. 2 depicts a method of organizing a graph according to an embodiment of the present invention.

According to an exemplary embodiments of the present invention, a method 200 (see FIG. 2) for organizing the graph at block 105 includes dividing the knowledge graph (KG) 201 with weighted edges (i.e., the output of block 104) into connected components 202, which are subgraphs of the KG where each node in a subgraph is connected through a path to one other node in the subgraph. Nodes in each component form a category. Each category is recursively divided into subcategories 203 until the size of each subcategory is no bigger than m nodes. According to some embodiments, the parameter m is chosen based on a user preference. An example value is 4, which means that the bottom most subcategory can at most contain 4 nodes. The division of a (sub)category into further subcategories can be done by a clustering algorithm that keeps a set of nodes, S, linked to each other by high-weight edges in the same cluster, and other nodes that have no links to the nodes in S or linked by low-weight edges to the nodes in Sin different clusters 204.

Figure 3:
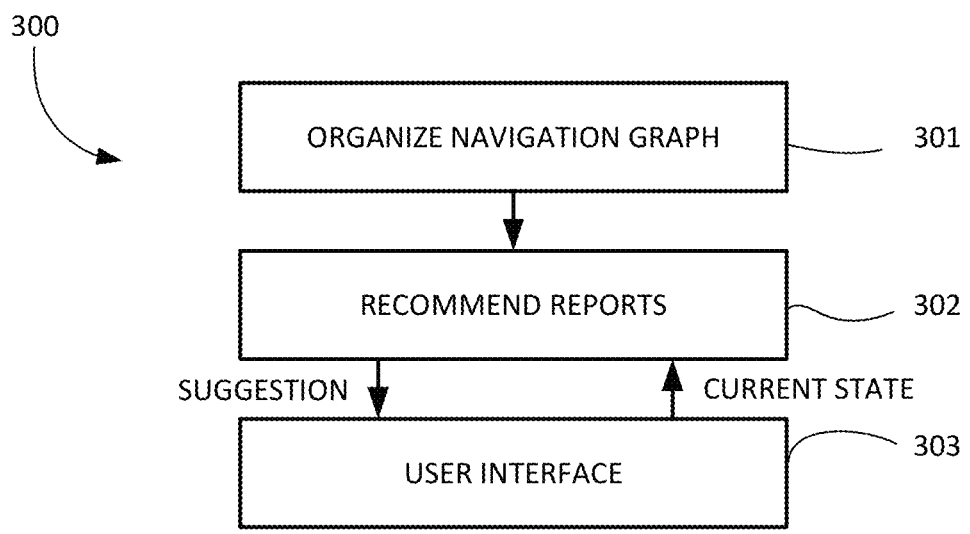
FIG. 3 depicts a method for selecting a report for review according to an embodiment of the present invention.

Referring to FIG. 3, given the organized navigation graph 301 output by the method 100 of FIG. 1, according to some embodiments of the present invention, a method 300 includes recommending a next report to examine 302 based on the organized graph 301 and a current state of user interface (UI) 303. A current state of the UI contains a sequence of reports already examined, $R_1, R_2, \ldots, R_i$, from the earliest, $R_1$, to the latest, $R_i$. In recommending a report 302, the method 300 identifies the top-k reports that are closest to a current report, $R_i$ (i.e., the latest report examined), but that have not yet been examined. These top-k closest reports to the current report $R_i$ are ranked by affinity score $a(R_i, R)$ where R is another report not yet examined. For a report R that is in the same cluster as $R_i$, the affinity score is equivalent to the edge weight between $R_i$ and R. According to at least one embodiment, for a report R that is in a different cluster as $R_i$, the affinity score is the reciprocal of the number of links to traverse from the $R_i$'s cluster to the cluster R belongs to in the hierarchy of clusters, plus the edge weight between R and $R_i$. In another method, the affinity score can be extended to the sequence of the reports, $R1, R2, \ldots, R_i$. It is calculated as $\alpha(R_i, R)+f^*\alpha(R_{(i-1)}, R)+f^{2*}\alpha(R_{(i-2)}, R)+ \ldots +f^{(i-1)*}\alpha(R_1, R)$, where f is a dampening factor having values $0 \leq f < 1$. According to some embodiments of the present invention, the damping factor is geometrically decreased for each successive previously reviewed report in a sequence.

According to one or more embodiments of the present invention, the automatic knowledge-graph construction and organization of the reports is applied for diagnosis. According to some embodiments, a next report to examine is suggested based on a current state of the UI—that is, the report sequence examined so far.

Figure 4:
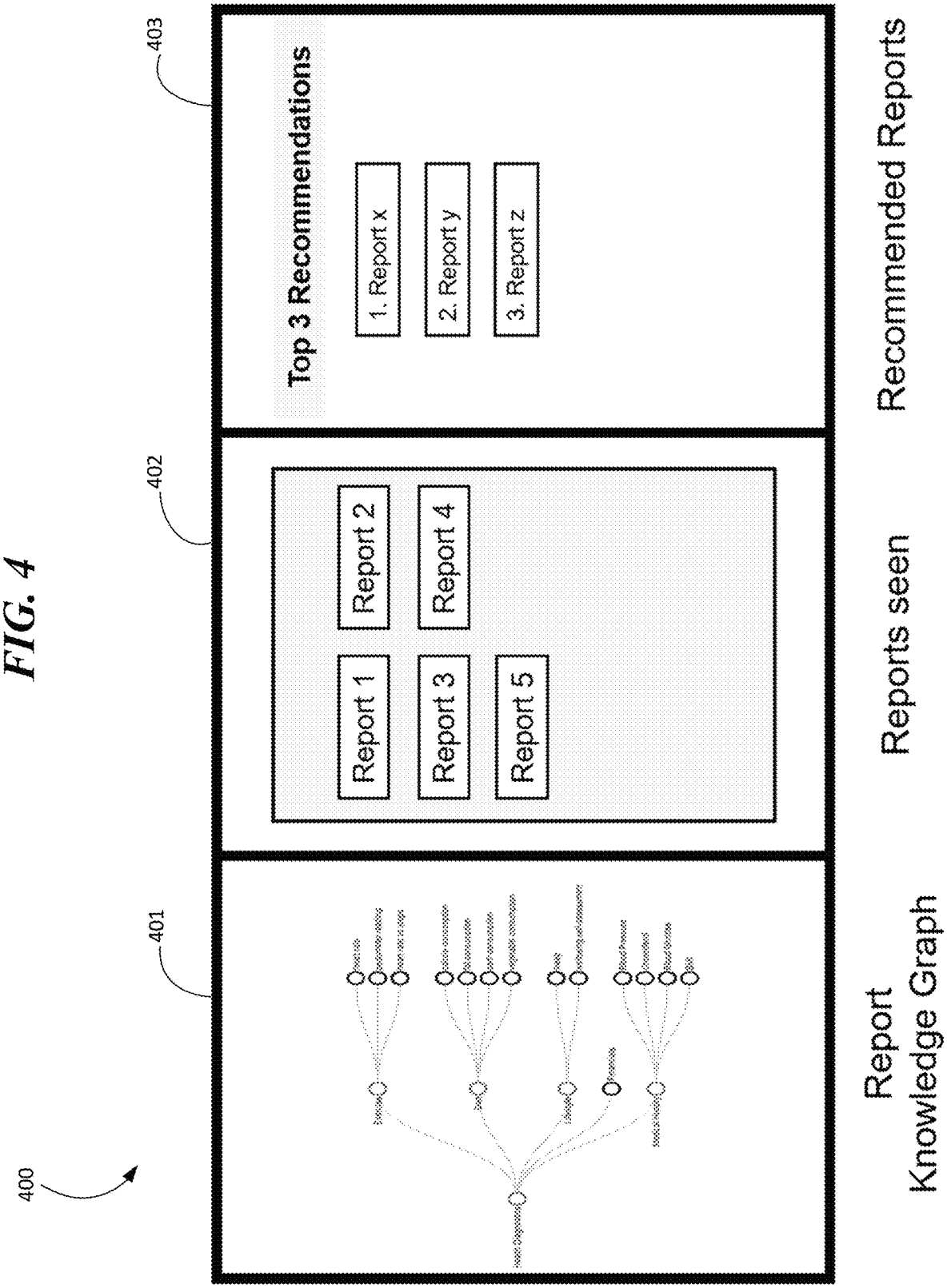
FIG. 4 depicts a view of a user-interface according to an embodiment of the present invention.

Embodiments of the present invention can be integrated into existing systems such as International Business Machines Corporation (IBMs) Cognos Business Intelligence integrated business intelligence suite. Cognos provides a toolset for reporting, analytics, score-carding, and monitoring of events and metrics. FIG. 4 shows an example of a UI 400 according to at least one embodiment of the present invention.

According to some embodiments, a cognitive UI 400 includes an interface that a view of the hierarchical organization of the reports 401, a view of the reports that have been examined 402 and a view of one or more reports that are recommended as candidates to review 403.

Recapitulation:

According to one or more embodiments of the present invention, a software tool automatically constructs and organizes a navigation graph to aid diagnosis in an application domain using existing reports, semantic models or formulas as input and building the navigation graph with reports as nodes and edges between nodes if data entities in one corresponding report are related to the data entities of the other report. According to at least one embodiment, the relationships between data entities is determined (for example, if the entities are the same, or if they are related to each other by the semantic models or formulas). According to some embodiments, the corresponding edge is weighted based on the strength of the relationship. According to one or more embodiments, within the navigation graph, nodes are formed into hierarchical clusters, cliques and partitions. Further, the use of the navigation graph, in the tool, guides reasoning and diagnostics about the concepts in the application domain by recommending the next report to explore based on the current state of the exploration (in a UI) and the organized navigation graph.

Referring again to FIG. 1, according to an embodiment of the present invention, a method for automatically constructing and organizing a navigation graph comprises receiving input data including a plurality of reports, at least two of the reports comprising plots (101), extracting a plurality of variables from the plots (102), building a knowledge graph from the input (103), wherein each node of the knowledge graph is associated with an individual one of the plots and an edge is added between two of the nodes sharing at least one of the variables in common, adding weights to the edges of the knowledge graph (104), and organizing the nodes of the knowledge graph for navigation (105), wherein the knowledge graph is displayed in a user interface (106).

Referring again to FIG. 1 and FIG. 3, according to an embodiment of the present invention, a method for guiding a review of documents comprises receiving input data including a plurality of reports comprising a plurality of plots of data (101), extracting a plurality of variables from the plots (102), building a knowledge graph from the input (103), wherein each node of the knowledge graph is associated with an individual one of the plots and an edge is added between two of the nodes sharing at least one of the variables in common, adding weights to the edges of the knowledge graph (104), organizing the nodes of the knowledge graph for navigation (301), tracking a sequence of previously reviewed reports of the plurality of reports (302-303), identifying top-k nodes from the nodes of the knowledge graph (302), wherein the top-k nodes correspond to reports of the plurality of reports that have not been reviewed and that are determined to have respective affinity scores closest to one of a last report to be reviewed according to the tracking and a sequence of reports previously reviewed according to the tracking, and ranking the top-k nodes, wherein the reports corresponding to the top-k nodes are displayed in a user interface in a ranked order.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for automatically constructs and organizes a navigation graph to aid diagnosis in an application domain. Further, a computer program product can include a tangible computer-readable recordable storage medium with code adapted to be executed to carry out one or more method steps described herein, including the provision of the system with the distinct software modules.

Figure 5:
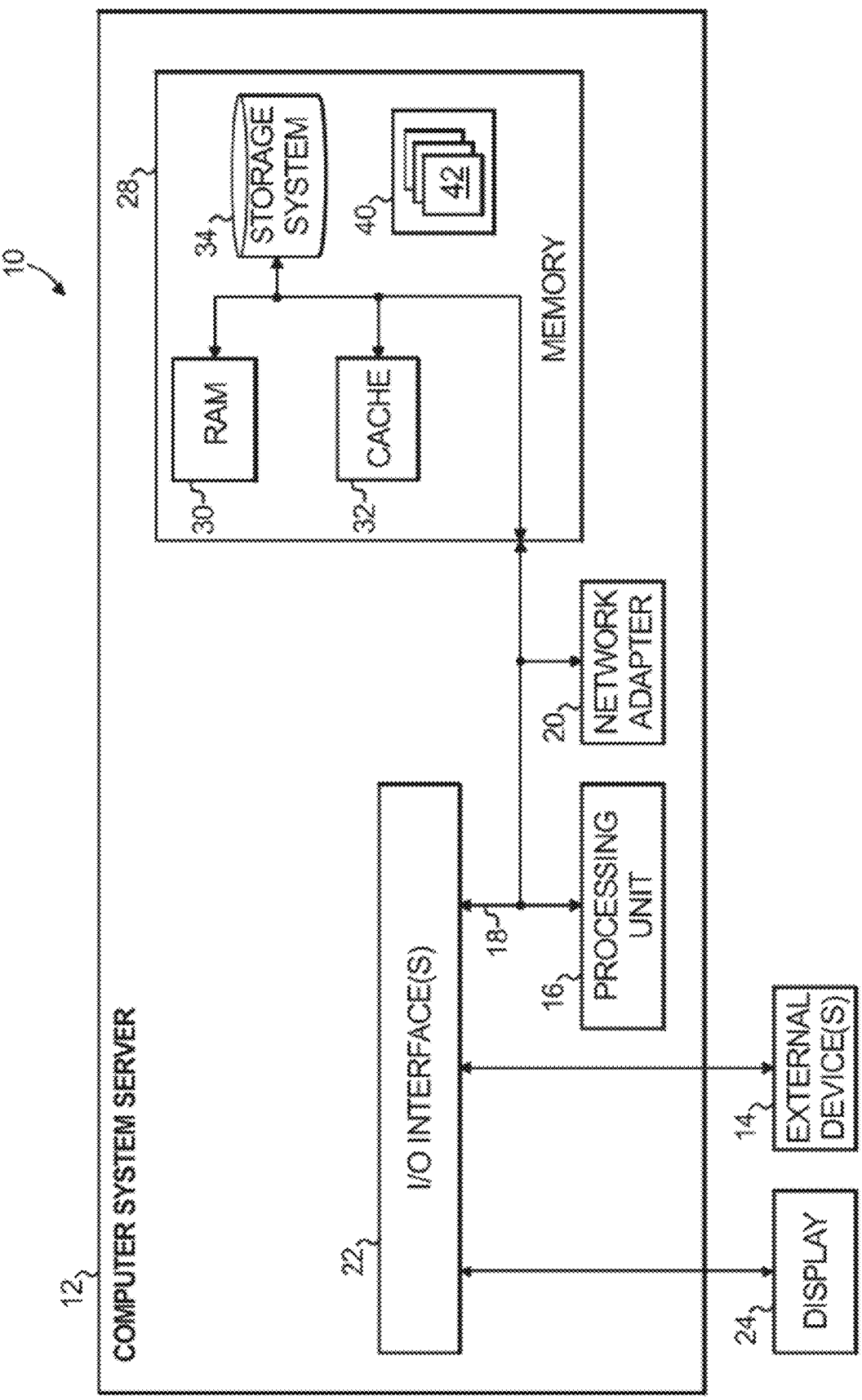
FIG. 5 is a block diagram depicting an exemplary computer system embodying a method for automatically constructs and organizes a navigation graph to aid diagnosis in an application domain according to an exemplary embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically constructing and organizing a navigation graph comprising:
   receiving input data including a plurality of reports, at least two of the reports comprising plots;
   receiving a semantic model giving relationships between terms and phrases describing the reports;
   extracting a plurality of variables from the plots;
   building a knowledge graph from the input, wherein each node of the knowledge graph is associated with an individual one of the plots and its respective variables of the plurality of variables, and an edge is added between two of the nodes sharing at least one of the variables in common;
   adding an edge weight to each of the edges of the knowledge graph, wherein the edge weights are calculated according to a number of the variables in common, and at least one of the edge weights is strengthen based on a number of semantically related ones of the variables in common, which are determined according to the semantic model; and
   organizing the nodes of the knowledge graph for navigation, wherein the knowledge graph is displayed in a user interface.

2. The method of claim 1, wherein at least two of the reports further comprise respective descriptions, the method further comprising adding an edge between two of the nodes having related language features in the respective descriptions.

3. The method of claim 1, wherein the weights of the edges are calculated according to a number of variables in common between ones of the nodes connected by the respective edges.

4. The method of claim 1, wherein the weights of the edges are calculated according to a relative importance of the variables in common between ones of the nodes connected by the respective edges.

5. The method of claim 1, further comprising:
   tracking a review of the nodes of the knowledge graph; and
   displaying a next node for review in the user interface, wherein the next node is selected from the nodes of the knowledge graph.

6. The method of claim 5, wherein displaying the next node for review comprises:
   determining a sequence of previously reviewed nodes;
   identifying top-k nodes from the nodes of the knowledge graph, wherein the top-k nodes have not been reviewed; and
   ranking the top-k nodes, wherein the top-k nodes are displayed in the user interface in a ranked order.

7. The method of claim 6, further comprising determining an affinity score for each of the nodes, wherein the ranking of the top-k nodes is performed using the affinity scores thereof.

8. The method of claim 6, further comprising determining an affinity score for each of the nodes, including determining an affinity score for a node in a same cluster as a node currently under review as the edge weight between the two nodes, and determining an affinity score for a node in a different cluster as the node under review as a reciprocal of a number of edges to traverse between the two clusters plus the edge weight between the two nodes.

9. A non-transitory computer readable storage medium comprising computer executable instructions which when executed by a computer cause the computer to perform a method of for automatically constructing and organizing a navigation graph, the method comprising:
   receiving input data including a plurality of reports, at least two of the reports comprising plots;
   receiving a semantic model giving relationships between terms and phrases describing the reports;
   extracting a plurality of variables from the plots;
   building a knowledge graph from the input, wherein each node of the knowledge graph is associated with an individual one of the plots and its respective variables of the plurality of variables, and an edge is added between two of the nodes sharing at least one of the variables in common;
   adding an edge weight to each of the edges of the knowledge graph, wherein the edge weights are calculated according to a number of the variables in common, and at least one of the edge weights is strengthen based on a number of semantically related ones of the variables in common, which are determined according to the semantic model; and
   organizing the nodes of the knowledge graph for navigation, wherein the knowledge graph is displayed in a user interface.

10. The computer readable storage medium of claim 9, wherein at least two of the reports further comprise respective descriptions, the method further comprising adding an edge between two of the nodes having related language features in the respective descriptions.

11. The computer readable storage medium of claim 9, wherein the weights of the edges are calculated according to a number of variables in common between ones of the nodes connected by the respective edges.

12. The computer readable storage medium of claim 9, wherein the weights of the edges are calculated according to a relative importance of the variables in common between ones of the nodes connected by the respective edges.

13. The computer readable storage medium of claim 9, further comprising:
　　tracking a review of the nodes of the knowledge graph; and
　　displaying a next node for review in the user interface, wherein the next node is selected from the nodes of the knowledge graph.

14. The computer readable storage medium of claim 13, wherein displaying the next node for review comprises:
　　determining a sequence of previously reviewed nodes;
　　identifying top-k nodes from the nodes of the knowledge graph, wherein the top-k nodes have not been reviewed; and
　　ranking the top-k nodes, wherein the top-k nodes are displayed in the user interface in a ranked order.

15. The computer readable storage medium of claim 14, further comprising determining an affinity score for each of the nodes, wherein the ranking of the top-k nodes is performed using the affinity scores thereof.

16. The computer readable storage medium of claim 14, wherein the affinity score for a node in a same cluster as a node currently under review is determined as the edge weight between the two nodes; and for a node in a different cluster as the node under review, the affinity score is the reciprocal of the number of edges to traverse between the two clusters plus the edge weight between the two nodes.

17. A method for guiding a review of documents comprising:
　　receiving input data including a plurality of reports comprising a plurality of plots of data;
　　extracting a plurality of variables from the plots;
　　building a knowledge graph from the input, wherein each node of the knowledge graph is associated with an individual one of the plots and an edge is added between two of the nodes sharing at least one of the variables in common;
　　adding an edge weight to each of the edges of the knowledge graph;
　　organizing the nodes of the knowledge graph for navigation;
　　tracking a sequence of previously reviewed reports of the plurality of reports;
　　identifying top-k nodes from the nodes of the knowledge graph, wherein the top-k nodes correspond to reports of the plurality of reports that have not been reviewed and that are determined to have respective affinity scores closest to one of a last report to be reviewed according to the tracking and a sequence of reports previously reviewed according to the tracking; and
　　ranking the top-k nodes, wherein the reports corresponding to the top-k nodes are displayed in a user interface in a ranked order.

18. The method of claim 17, further comprising determining the affinity scores of the top-k nodes to the sequence of reports previously reviewed using a dampening factor that is geometrically decreased for each successive previously reviewed report in the sequence.

* * * * *